(12) United States Patent
Cunico et al.

(10) Patent No.: US 9,332,223 B2
(45) Date of Patent: *May 3, 2016

(54) DYNAMIC CHARACTER SUBSTITUTION FOR WEB CONFERENCING BASED ON SENTIMENT

(71) Applicant: International Business Machines Corporation, Armonk, NY (US)

(72) Inventors: Hernan A. Cunico, Holly Springs, NC (US); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/623,139

(22) Filed: Feb. 16, 2015

(65) Prior Publication Data

US 2015/0381933 A1   Dec. 31, 2015

Related U.S. Application Data

(63) Continuation of application No. 14/320,131, filed on Jun. 30, 2014, now Pat. No. 9,204,098.

(51) Int. Cl.
*H04N 7/15* (2006.01)
*G06F 17/27* (2006.01)
*H04N 5/77* (2006.01)

(52) U.S. Cl.
CPC .............. *H04N 7/15* (2013.01); *G06F 17/2785* (2013.01); *H04N 5/77* (2013.01)

(58) Field of Classification Search
USPC ....................................................... 348/14.08
See application file for complete search history.

(56) References Cited

U.S. PATENT DOCUMENTS

| | | | |
|---|---|---|---|
| 8,243,116 B2 | 8/2012 | Qvarfordt et al. | |
| 8,279,256 B2 | 10/2012 | Yang et al. | |
| 2009/0079816 A1 | 3/2009 | Qvarfordt et al. | |
| 2011/0060591 A1 | 3/2011 | Chanvez et al. | |
| 2011/0263940 A1 | 10/2011 | Yamaguchi | |
| 2012/0290950 A1 | 11/2012 | Rapaport et al. | |
| 2013/0088562 A1 | 4/2013 | Hong et al. | |
| 2013/0139071 A1 | 5/2013 | Hoff et al. | |
| 2013/0176379 A1 | 7/2013 | Rosenberg et al. | |
| 2013/0242031 A1 | 9/2013 | Petterson et al. | |
| 2014/0032215 A1 | 1/2014 | Bolton et al. | |
| 2014/0201126 A1 | 7/2014 | Zadeh et al. | |
| 2014/0314310 A1 | 10/2014 | Movellan et al. | |

(Continued)

OTHER PUBLICATIONS

Ask Ubuntu, "How do I feed Skype a prerecorded video", last edited Oct. 7, 2011, <http://askubuntu.com/questions/64700/how-do-i-feed-skype-a-prerecorded-video>.

(Continued)

*Primary Examiner* — Creighton Smith
(74) *Attorney, Agent, or Firm* — Maeve M. Carpenter (57) ABSTRACT

In an approach to determine a pre-recorded video for use in place of a video feed of a user in a video conference, a computer receives one or more pre-recorded videos of a user in which the pre-recorded videos include at least one visual representation of an emotional state. The computer determines a meeting tone of at least one meeting discussion in the video conference and determines a first video of the one or more pre-recorded videos of the user that corresponds to the meeting tone. The computer substitutes the first video into the video conference in place of a video feed in the video conference.

8 Claims, 3 Drawing Sheets

(56) References Cited

U.S. PATENT DOCUMENTS

2015/0092009 A1 4/2015 DeLuca et al.
2015/0169938 A1 6/2015 Yao et al.

OTHER PUBLICATIONS

Design, "Face Substitution demo", Vimeo, LLC, Copyright 2014, <http://vimeo.com/45826030>.
McDonald, "Face Substitution", Vimeo, LLC, Copyright 2014, <http://vimeo.com/29348533>.
H, Rasmus, "Face Substitution", You Tube, Published Jun. 13, 2013, <http://www.youtube.com/watch?v=HYYoex2wF38>.
Popular Science, "Creepiest Video Software Ever Substitutes Other People's Faces for Your Face, In Real Time", Copyright 2014, <http://www.popsci.com/technology/article/2011-09/creepiest-video-software-ever-substitutes-faces-real-time>.
ReadyTalk, <http://www.readytalk.com>, Copyright 2014.
Appendix P (List of IBM Patents or Patent Applications Treated As Related).
U.S. Appl. No. 14/320,131, entitled "Dynamic Character Substitution for Web Conferencing Based on Sentiment", filed Jun. 30, 2014.
U.S. Appl. No. 14/320,233, entitled "Dynamic Facial Feature Substitution for Video Conferencing", filed Jun. 30, 2014.
U.S. Appl. No. 14/623,079, filed Feb. 16, 2015 entitled "Dynamic Facial Feature Substitution for Video Conferencing".
U.S. Appl. No. 14/881,553, filed Oct. 13, 2015.

DYNAMIC CHARACTER SUBSTITUTION FOR WEB CONFERENCING BASED ON SENTIMENT

CROSS-REFERENCE TO RELATED APPLICATION

This application is related to application Ser. No. 14/320,233.

FIELD OF THE INVENTION

The present invention relates generally to the field of video conferencing, and more particularly to the use of natural language processing and sentiment analysis in determining a tone or sentiment of a video conference to enable dynamic character substitution.

BACKGROUND OF THE INVENTION

Global business meetings commonly occur by video conference, connecting people across multiple continents and time zones. Video conferences provide attendees with the ability to interact and more clearly communicate using visual and verbal communication cues. Attendees may use facial expressions to aide verbal communication and, through face to face communication, develop relationships that aide in business endeavors and team building.

Sentiment analysis is performed by leveraging natural language processing, text analysis and computational linguistics to identify and extract subjective information in source materials including written or spoken material. Sentiment analysis aides in the understanding of effective communication and recognition of emotions during human-computer interactions. Sentiment analysis includes polarity which considers emotional classifications such as "positive", "negative" or "neutral" text (or speech) and advanced polarity which considers emotional classifications such as happy, sad, fear, disgust, surprise and anger. A developed and fairly mature technology as applied to the written word such as books, articles, and political event reports, sentiment analysis progresses to the spoken word and human speech with the advent of speech analysis programs and natural language processing. Generally speaking, sentiment analysis aims to determine the attitude and/or reaction of a speaker with respect to some topic or discussion in the overall context of a discussion where the attitude may be determined not just by what is said but, how it is said.

Natural language processing (NLP) is a field of computer science, artificial intelligence, and linguistics. A segment of computer programming that focuses on the interaction between computers and human natural language, NLP creates the ability of a computer to assimilate commands or human speech in natural language and to respond programmatically or to respond verbally (e.g. to reply to a person in a natural language). NLP utilizes linguistics, as one of the building blocks of NLP. Many challenges in NLP involve natural language understanding, that is, enabling computers to derive meaning from human or natural language input. NLP algorithms are based on machine learning, including particularly statistical machine learning.

NLP and sentiment analysis use includes data mining on the internet or social media, product reviews, movie reviews, TV news casts, and chat rooms. Businesses use NLP with sentiment analysis to improve customer relationships, products and company image by increasing an understanding of the customer perceptions and reactions to products and communications such as occurs with live company representatives. Understanding an individual's perceptions or emotional response to written, visual and spoken information and communications provides an opportunity to improve relationships and improve the effectiveness of communication of information for the desired impact.

SUMMARY

Embodiments of the present invention disclose a method, computer program product, and computer system for determining a pre-recorded video for use in a video conference. A computer receives one or more pre-recorded videos of a user, the one or more pre-recorded videos including at least one visual representation of an emotional state. The computer determines a meeting tone of at least one meeting discussion in a video conference and determines a first video of the one or more pre-recorded videos of the user that corresponds to the meeting tone. Furthermore, the computer retrieves the first video and substitutes the first video into the video conference in place of a video feed in the video conference.

DETAILED DESCRIPTION

Video conferences provide a cost effective method to allow virtual face to face meetings with global attendees to aid in effective team building, problem solving and cost effective status meetings where attendees can use both verbal and visual communication modes. Embodiments of the present invention recognize that not all video conferences occur during regular work hours and while, ideally meeting attendees should present a business appropriate appearance, sometimes this is difficult to do. In addition, some attendee's role may only require a need to listen for status updates which may allow them to perform other tasks e.g. check mail or texts, or watch a newscast or stock report during the meeting, which may be disruptive or disrespectful to presenters or other attendees.

Embodiments of the present invention provide a video conference attendee with the capability to attend a video conference without business appropriate attire or to attend to other business during the meeting by providing the meeting attendee with a pre-recorded video or an avatar for use in place of a live video feed of the meeting attendee. In particular, a dynamic character substitution program uses natural language processing and sentiment analysis to determine the meeting tone and sentiment and in response, determines an appropriate pre-recorded video of the meeting attendee visually expressing or exhibiting a similar or corresponding emotion or reaction. For the purposes of the embodiments of the present invention, a dynamic character substitution is the replacement of a live video feed of a video conference attendee with a pre-recorded video of the video conference attendee (e.g. an avatar), selected to match or correspond to the tone or sentiment of the video conference as determined by NLP and sentiment analysis. Furthermore, in response to changes in the video conference tone, embodiments of the invention change the pre-recorded video used to represent the video conference attendee to match or correspond to the changed video conference tone.

Figure 1:
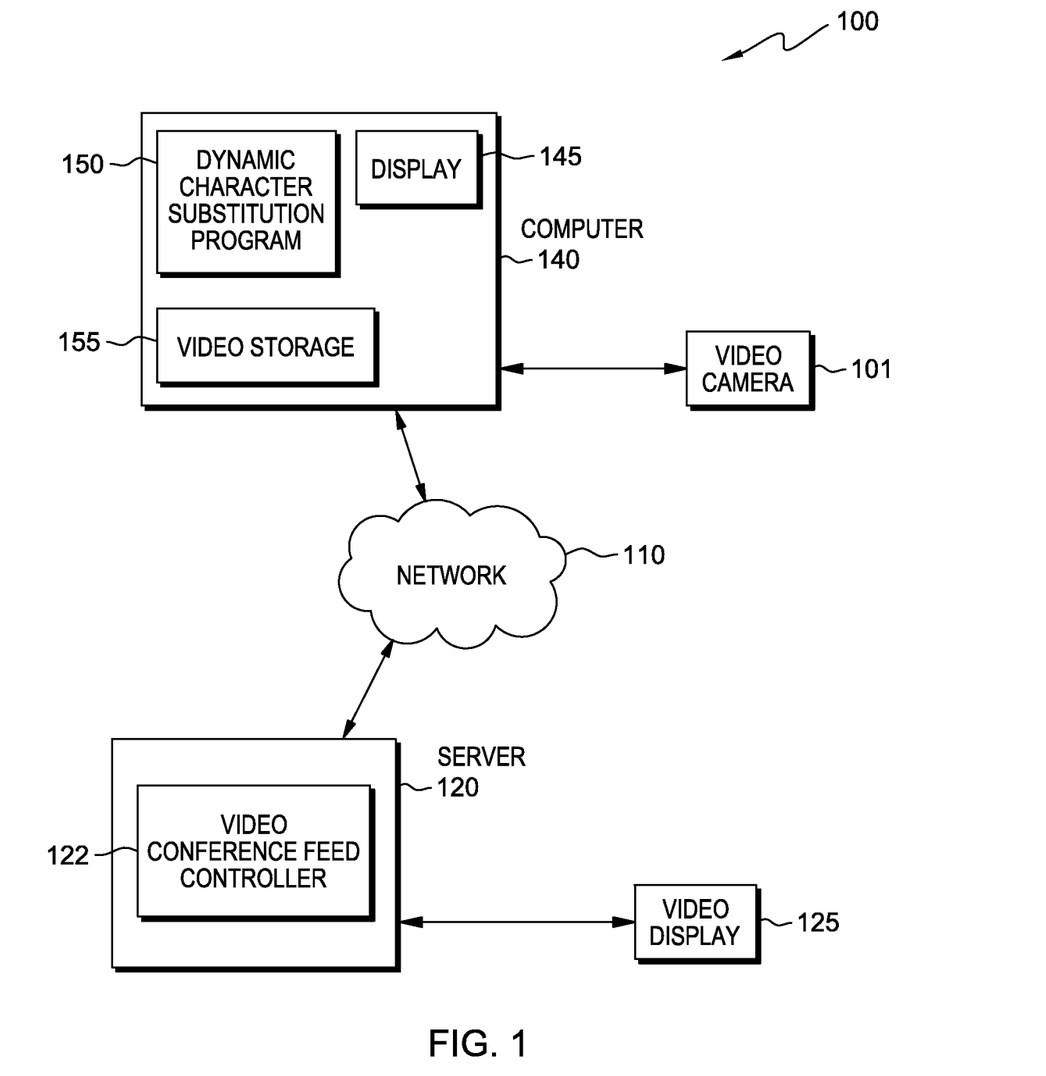
FIG. 1 is a functional block diagram illustrating a distributed data processing environment for a sentiment based dynamic character substitution program, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. Distributed data processing environment 100, includes network 110, server 120 and computer 140, in accordance with an exemplary embodiment of the present invention.

In the exemplary embodiment, network 110 is the Internet representing a worldwide collection of networks and gateways that use TCP/IP protocols to communicate with one another. Network 110 may include cable, routers, switches and/or firewalls. Server 120 and computer 140 are interconnected by network 110. Network 110 can be any combination of connections and protocols capable of supporting communications between server 120, computer 140, video camera 101, and dynamic character substitution program 150. Network 110 may also be implemented as a number of different types of networks, such as an intranet, a local area network (LAN), a virtual local area network (VLAN), a wide area network (WAN), or any combination of a number of different types. FIG. 1 is intended as an example, and not as an architectural limitation for the different embodiments.

In the exemplary embodiment, server 120 may be, for example, a web server, a server computer such as a management server, or any other electronic device or computing system capable of sending and receiving data. In another embodiment, server 120 represents a "cloud" of computers interconnected by one or more networks, where server 120 is a computing system utilizing clustered computers and components to act as a single pool of seamless resources when accessed through network 110. Server 120 includes video conference feed controller 122 which receives video from computer 140 displayed on video display 125 connected to server 120.

In the exemplary embodiment, computer 140 is a client to server 120, and may be, for example, a notebook, a laptop, a smartphone, a personal digital assistant (PDA), a tablet, a desktop computer, a wearable computing device or any other computing system capable of communicating with server 120 through network 110. In the exemplary embodiment, computer 140 receives video recorded from video camera 101 which is stored in video storage 155. In another embodiment, computer 140 may provide the ability to record video such as with a smartphone or a tablet with video capability. In the exemplary embodiment, a user is an attendee of a video conference operated by video conference feed controller 122 on server 120 and computer 140 receives one or more live video feeds shown on display 145 for the video conference via network 110. In one embodiment, computer 140 may not be a client device to server 120 but, may be connected via network 110 with one or more computing devices such as smart phones, laptops, wearable computing devices or notebooks which have video conference applications and video capability. Dynamic character substitution program 150 resides on computer 140 with display 145 and video storage 155. Display 145 displays to the user video feed from a video conference and may also be a user interface. In another embodiment, dynamic character substitution program 150 is partially or fully integrated on server 120, or a remote "cloud" server such as a computer or a group of computing machines connected by a LAN or WAN. Computer 140 may include internal and external hardware components, as depicted and described in further detail with respect to FIG. 3.

In various embodiments, dynamic character substitution program 150 on computer 140 utilizes known sentiment analysis methods and natural language processing (NLP), to determine a tone and/or sentiment of a video conference meeting. In the exemplary embodiment, using NLP and sentiment analysis of meeting discussions from a live feed of video from video camera 101 in a video conference, dynamic character substitution program 150 determines the meeting tone and sentiment. In other embodiments, dynamic character substitution program 150 may receive one or more video feeds from server 120 or other computing devices such as smart phones or wearable computing devices. When a user requests an avatar or a pre-recorded video or videos for use in place of a live video feed of the user in a video conference, dynamic character substitution program 150 utilizes the meeting tone and sentiment and determines the avatar or video portraying a similar tone and sentiment to the meeting tone and sentiment. Dynamic character substitution program 150 determines the video portraying an emotional state corresponding to the meeting tone and sentiment by using a correlation such as a table matching a meeting tone and sentiment to one or more videos of the attendee or user exhibiting an emotion, reaction, sentiment or emotional state that is similar or corresponds to the meeting tone and sentiment. Upon determining the appropriate video for dynamic character substitution of the requesting user in the video conference, dynamic character substitution program 150 retrieves the determined video from video storage 155 for transmittal over network 110 to video conference feed controller 122 on server 120 and for display within the video conference.

Video storage 155 included on computer 140 stores videos recorded by video camera 101 or a similar digital recording device capable of recording and sending video to computer 140. In an embodiment of the present invention, dynamic character substitution program 150 may retrieve pre-recorded videos stored in video storage 155 for dynamic character substitution. While depicted on computer 140 in the exemplary embodiment, video storage 155 may be included on a remote server, a web server, or a "cloud" of computers interconnected by one or more networks utilizing clustered computers and components to act as a single pool of seamless resources, accessible by dynamic character substitution program 150 via network 110.

Figure 2:
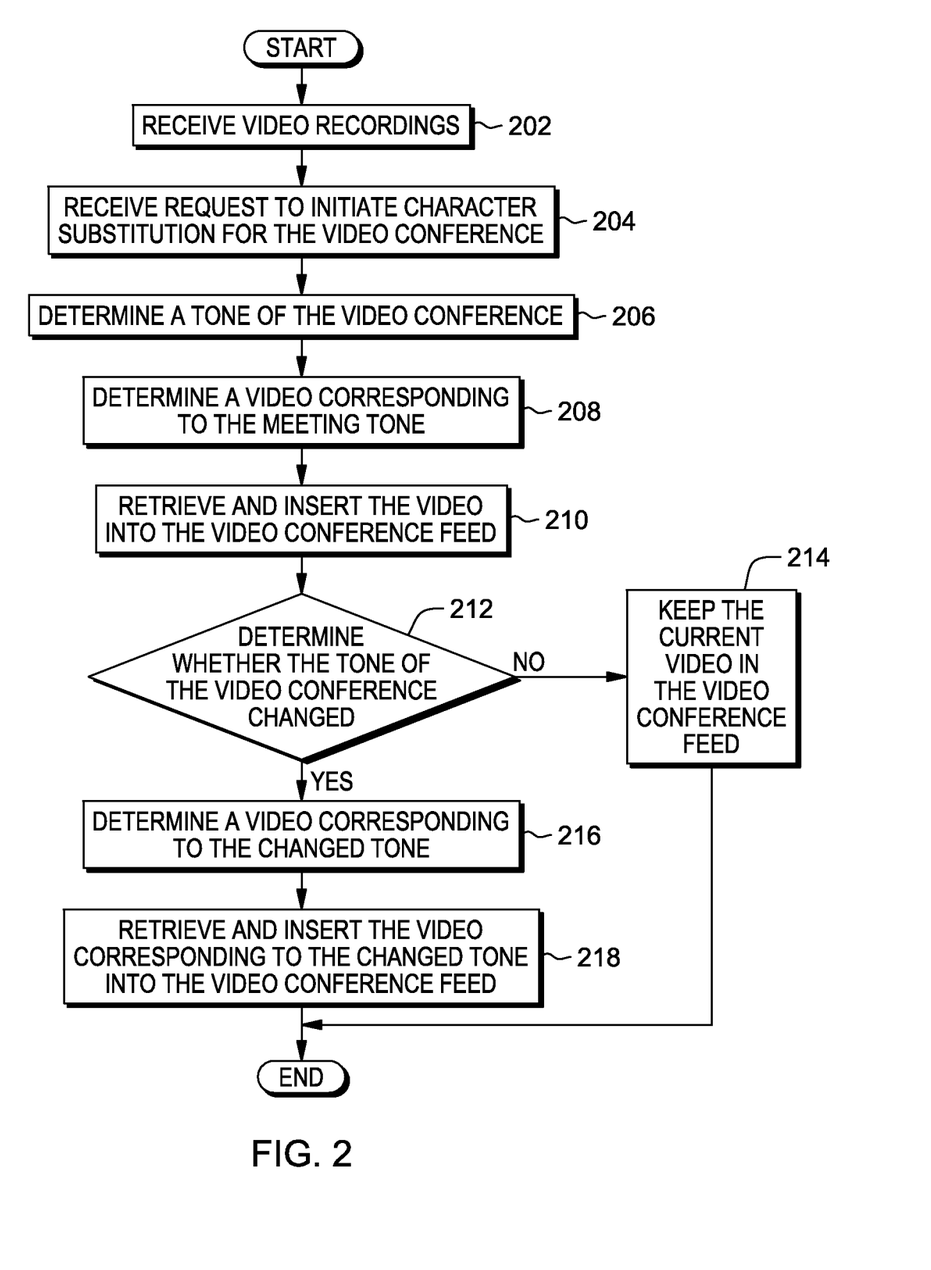
FIG. 2 is a flowchart depicting operational steps of a sentiment based dynamic character substitution program for video conferencing, on a computer within the data processing environment of FIG. 1, in accordance with an embodiment of the present invention.

FIG. 2 is a flowchart depicting operational steps of dynamic character substitution program 150 for dynamic character substitution in a video conference, in accordance with an embodiment of the present invention.

Dynamic character substitution program 150 receives video recordings in step 202. Dynamic character substitution program 150 enables dynamic character substitution for a video conference attendee by receiving from video camera 101 one or more video recordings of a user. In the exemplary embodiment, the pre-recorded video recordings include the user of computer 140, referred to as the "user" forthwith, reacting to various conversational situations and expressing various emotional states. Dynamic character substitution program 150 receives a series of one or more pre-recorded video recordings of the user representing multiple emotional states or emotions. In an embodiment of the present invention, the user may request the use of a character or an avatar for substitution in place of the user in a video conference using one or more of the pre-recorded videos to represent the user instead of a live video feed of the user of computer 140. The video recordings of the user portray visual representations including various responses, sentiments or emotional states that might be exhibited in a video conference by a video conference attendee. In an embodiment, the video recordings capture the attendee's full body or at least a partial view of the attendee's torso and shoulders. In the exemplary embodiment, video camera 101 records the individual videos or video segments and sends the videos to computer 140 for storage in video storage 155. In one embodiment, computer 140 which may be, for example, a smartphone or a tablet, records the videos, receives a video filename from the user interface and stores the videos by filename in video storage 155. In another embodiment, a single video recording of the user may capture all of the responses or emotional states anticipated to be exhibited in a video conference. Dynamic character substitution program 150 can identify the appropriate section or segment of the video using an index of the video or markers within the video to identify desired video sections depicting the desired emotional state. For example, a video may have recorded minutes one to three depicting a neutral state and minutes three to six depicting a slightly happy state (e.g. a light smile), to match an appropriate determined neutral meeting discussion tone, and dynamic character substitution program 150 proceeds the marker or index point from the beginning of the first minute of the video.

The individual videos or video segments portray a range of emotions or emotional states from, for example, angry to sad to happy. Each video or video segment may be identified or partially identified by the depicted emotional state or sentiment in video storage 155. In other embodiments, each video or video segment can be tagged or named with a date, user name, or other identifying information. Dynamic character substitution program 150 may receive videos provided with a video filename, received from a user interface, associated or related to the emotional state the video portrays. The video filenames, for example, may be an alpha or an alpha/numeric filename relating to the emotional state and the intensity or range of the emotional state. In one example, dynamic character substitution program 150 may receive one or more video recordings of a neutral state, an active listening state such as leaning forward, an alert state or reaction to the user's name, a surprised state, an angry state, a disgusted or frustrated state, a fearful state, and a happy state for the requesting user.

Dynamic character substitution program 150 may receive one or more videos of an emotional state portraying a range of the emotional state (various levels of intensity of the emotional state or a range of the emotion portrayed), for example, dynamic character substitution program 150 may receive three videos or video segments depicting a "happy" state. The three videos depicting a "happy" state may, for example, include a video of the user exhibiting a slight smile, a video with a larger, broader smile (lips open), and a video with the user laughing with a large smile, each video received with filenames: happy01, happy02, and happy03. In addition, dynamic character substitution program 150 may receive several videos or video segments depicting an emotional state. Dynamic character substitution program 150 may, for example, receive four videos of various lengths representing the subject in a neutral or listening state. In the four videos of a neutral emotional state, there may be small changes in posture or a limited motion or action such as taking a note or viewing a cell phone for a minute to provide realistic and variable options for the dynamic character substitution in a video conference. The four videos of varying length may be, for example, three to fifteen minutes long. In one embodiment, additional video recordings depicting the emotional states of the user may be received by dynamic character substitution program 150 wearing different clothes. In another embodiment, dynamic character substitution program 150 provides the capability for the user to request dynamic character substitution program 150 to change the color of the clothing in a video recording using available digital video enhancement technology.

Dynamic character substitution program 150 receives a request to initiate character substitution for the video conference in step 204. Dynamic character substitution program 150 may receive requests for an avatar or pre-recorded video for substitution at any time in the video conference. Similarly, a request for termination of the avatar (e.g. character substitution) may occur at any time in the video conference. Dynamic character substitution program 150 initiates dynamic character substitution determination for a video conference upon receiving from the user of computer 140 a request for character substitution. In the exemplary embodiment, dynamic character substitution program 150 retrieves an initial video or introductory video file from video storage 155. A pre-determined initial video or short introductory video may be retrieved from video storage 155, for example, a video named "greeting01" which may include the subject saying "Hello, Jack Smith in Austin." In another embodiment, if no introductions or greetings are occurring in the video conference, dynamic character substitution program 150 may determine another initial video of for example, a neutral emotional state that has been identified or tagged by the user interface as a potential initial video be used in the video conference. In another embodiment, the user may join a meeting and perform introductions, and after a period of time, initiate dynamic character substitution program 150.

Dynamic character substitution program 150 determines the tone of the video conference in step 206. Dynamic character substitution program 150 analyzes the video conference discussions to determine the meeting tone and sentiment using natural language processing and sentiment analysis. One skilled in the art recognizes that natural language processing programs and applications exist that include speech recognition and sentiment analysis. Dynamic character substitution program 150 may incorporate or use available programs or applications utilizing various techniques for sentiment analysis including part of speech (PoS) tagging (e.g. nouns, adverbs, adverb-verb clusters, etc.), acoustic approaches (e.g. intensity, pitch, loudness, speech signal amplitude, speech signal frequency), and linguistic approaches (e.g. lexical approaches including words, phrases (PoS), phonetic indexing, disfluencies including pauses, hesitation, non-verbal such as laugher or sighs, higher semantics including taxonomy and dialog history) to monitor and determine the meeting tone and sentiment. In some embodiments, additional information on meeting tone or sentiment may be gathered by recording the number and frequency of "talk overs" where one speaker talks over or interrupts another speaker.

Using NLP and sentiment analysis of the meeting discussions in the video conference, dynamic character substitution program 150 determines the meeting tone or sentiment. For example, the meeting tone or sentiment may be determined as one of the following: negative, slightly negative, frustrated, angry, tense, sad, neutral, slightly positive, animated, slightly positive, positive, happy, very happy/humorous using NLP and sentiment analysis. A very happy or humorous meeting tone or sentiment may occur as multiple video conference attendees laugh at a joke, while an angry meeting tone may include raised voices with tagged negative or derogatory phrases. In an embodiment, dynamic character substitution program 150 assigns the meeting tone an identification such as a name, a label or a tag relating to the sentiment or tone. For example, slightly negative meeting tone may be named "tone negative02" or "slightly negative tone" while a neutral meeting tone may be assigned "tone neutra100".

Dynamic character substitution program 150 determines the video which corresponds to the meeting tone in step 208. Dynamic character substitution program 150 determines the video to use in the video conference for dynamic character substitution of the user in the meeting based on the determination of the meeting tone and sentiment. In the exemplary embodiment, dynamic character substitution program 150 determines a table or list pairing the meeting tone or sentiment name with one or more videos of the user portraying the emotional state or reaction associated to or corresponding with that meeting tone or sentiment. Dynamic character substitution program 150 may determine the video to correlate to the meeting tone or sentiment by one or more methods. For example, dynamic character substitution program 150 may correlate the tone and video by matching similar tone names and video filenames when descriptive names are used for files. In another embodiment, dynamic character substitution program 150 may correlate the tone and video using a database providing images or videos of a tone or sentiment paired with the associated tone or sentiment name. In another embodiment, dynamic character substitution 150 receives from the user a table or list pairing the meeting tone or sentiment name with one or more videos of the user portraying the emotional state or reaction associated to the meeting tone or sentiment.

Using the determined table, list or similar correlation identifier that matches a meeting tone or sentiment with a video representing an appropriate user reaction or facial expression or visual representation of the corresponding emotional state, the appropriate video is retrieved to match the meeting tone. In an exemplary embodiment, dynamic character substitution program 150 matches a meeting tone or sentiment with a video representing a similar or corresponding emotional state by correlating the meeting tone or sentiment to a video filename. Using the user pre-defined video filenames, dynamic character substitution 150 can determine the matching meeting tones and sentiments with video filenames. Based on an analysis, for example, a text analysis of the text of the video conference discussions, dynamic character substitution program 150 may correlate or match a meeting tone "negative01" with a video filename "frown01" while a very happy or humorous meeting tone with detected laughter "laugh02" may correlate with a video of the user laughing, named "laugh02". In an embodiment, a neutral meeting tone or sentiment may have one or more corresponding video filenames. For example, a neutral meeting tone may have several videos or video filenames corresponding to the neutral meeting tone since meetings commonly are neutral in meeting tone or sentiment. Similarly, dynamic character substitution program 150 may associate more than one video filename with unusual or rare tones, such as laughter, that may occur in very happy or humorous meetings.

Dynamic character substitution program 150 retrieves and substitutes the video in the video conference feed in step 210. Dynamic character substitution program 150 retrieves the determined video to use in the video conference for dynamic character substitution of the user and uses the determined video to represent the user in the video conference. Dynamic character substitution program 150 retrieves the determined video from video storage 155. Dynamic character substitution program 150 substitutes and displays the determined video as a video feed in the video conference feed from computer 140 via network 110 to video conference feed controller 122. Video display 125 shows the determined video to represent the user in the video conference in place of live feed in the video conference.

Dynamic character substitution program 150 determines whether the tone of the video conference changed in decision step 212. Dynamic character substitution program 150 monitors and analyzes the meeting tone of the continued video conference meeting discussions using NLP and sentiment analysis to determine if the meeting tone and sentiment has changed. Using the techniques discussed in step 206, dynamic character substitution program 150 monitors and analyzes the video conference meeting discussions to determine if the meeting tone and sentiment changed from the initial determination of the meeting tone and sentiment.

If dynamic character substitution program 150 determines that the tone of the video conference has not changed (the "NO" branch of step 212), then dynamic character substitution program 150 keeps the current video in the video conference feed in step 214. When dynamic character substitution program 150 detects no change in the meeting tone, the program continues using the determined (step 208) and displayed video to represent the user. In an embodiment, when the meeting tone remains the same for a significant time, the videos of the same emotional state may be rotated to keep a realistic image of the user in the video conference. For example, if a meeting tone remains neutral, an additional video or a different video including several videos of the neutral emotional state can be correlated to a neutral meeting tone. A set of videos, including a random video rotation for emotional states with more than one video of the emotional state may be used. Dynamic character substitution program 150 determines the rotation time, for example, change videos every five minutes.

If dynamic character substitution program 150 determines that the tone of the video conference has changed (the "YES" branch of step 212), then dynamic character substitution program 150 determines a video corresponding to the changed tone in step 216. Using the method discussed in step 208, dynamic character substitution program 150 can determine the video correlating to the changed meeting tone or sentiment by correlating the meeting tone with a video filename representing a similar or corresponding emotional state.

Dynamic character substitution program 150 retrieves the determined video to use in the video conference for dynamic character substitution of the subject and inserts the video corresponding to the changed tone into the video conference feed in step 218. In various embodiments, dynamic character substitution program 150 can digitally blend the transition of the first determined video into the second determined video. Dynamic character substitution program 150 can blend or smooth the video transition from the first determined video into the second determined video using known digital video editing techniques providing a seamless video feed from computer 140 to video display 125 in the video conference. Dynamic character substitution program 150 can blend the determined videos for use for the user in the video conference, and can continuously monitor and analyze the tone of the meeting to allow a video conference attendee who does not wish to provide a live feed in a video conference to maintain a visible presence that dynamically changes reflecting the tone or mood of the discussions in a video conference. In an embodiment, dynamic character substitution program 150 ends with the completion of the video conference or at anytime when the attendee exits the program, for example, to leave the video conference or to use a live video feed for the video conference.

Figure 3:
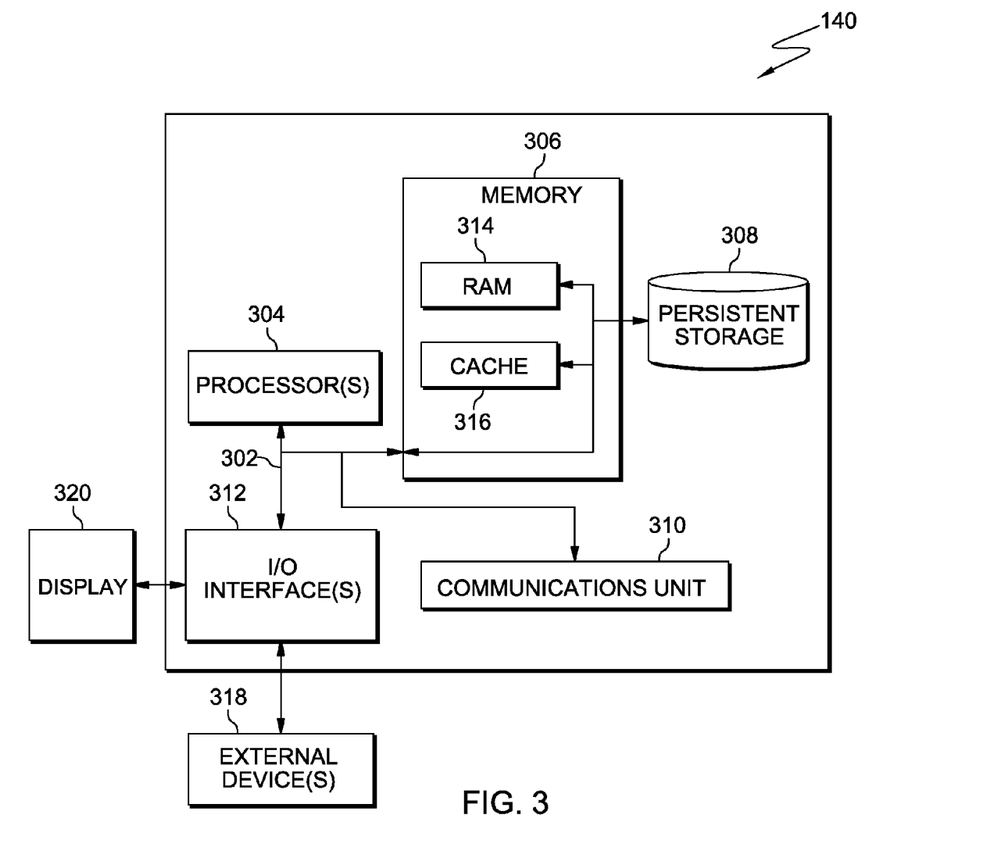
FIG. 3 depicts a block diagram of components of the computer executing the sentiment based dynamic character substitution program, in accordance with an embodiment of the present invention.

FIG. 3 depicts a block diagram of components of computer 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 140 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache memory 316. In general, memory 306 can include any suitable volatile or non-volatile computer readable storage media.

Dynamic character substitution program 150 and video storage 155 can be stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of distributed data environment 100 such as computer 140, server 120, video display 125, and video camera 101. In these examples, communications unit 310 includes one or more network interface cards. Communications unit 310 may provide communications through the use of either or both physical and wireless communications links. Dynamic character substitution program 150 may be downloaded to persistent storage 308 through communications unit 310.

I/O interface(s) 312 allows for input and output of data with other devices that may be connected to computer 140. For example, I/O interface(s) 312 may provide a connection to external device(s) 318 such as a keyboard, a keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., dynamic character substitution program 150 and video storage 155 can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, method, and/or computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for determining a pre-recorded video for use in a video conference, the method comprising:
  receiving, by one or more computer devices, one or more pre-recorded videos of a user, the one or more pre-recorded videos including at least one visual representation of an emotional state;
  determining, by one or more computer devices, a meeting tone of at least one meeting discussion in the video conference;
  determining, by one or more computer devices, a first video of the one or more pre-recorded videos of the user that corresponds to the meeting tone; and
  substituting, by one or more computer devices, the first video into the video conference in place of a video feed of the video conference.

2. The method of claim 1, further comprising receiving, by one or more computer devices, a request from the user for the one or more pre-recorded videos of the user for use in the video conference in place of the video feed in the video conference.

3. The method of claim 2, wherein the request from the user is received during the video conference.

4. The method of claim 1, wherein determining, by one or more computer devices, the meeting tone further comprises analyzing the at least one meeting discussion in the video conference using at least one of a natural language processing and a sentiment analysis.

5. The method of claim 1, wherein determining, by one or more computer devices, the first video of the one or more pre-recorded videos of the user that corresponds to the meeting tone further comprises matching the meeting tone with the first video, based, at least in part, on a filename of the first video.

6. The method of claim 1, wherein determining, by one or more computer devices, the first video of the one or more pre-recorded videos of the user that corresponds to the meeting tone further comprises determining a video segment from the one or more pre-recorded videos of the user that corresponds to the meeting tone.

7. The method of claim 1, further comprises:
  monitoring, by one or more computer devices, the at least one meeting discussion in the video conference;
  determining, by one or more computer devices, whether the meeting tone of the at least one meeting discussion changed; and
  responsive to determining the meeting tone of the at least one meeting discussion changed, determining, by one or more computer devices, a second video of the one or more pre-recorded videos that corresponds to the changed meeting tone.

8. The method of claim 7, further comprising:
  responsive to determining the meeting tone of the at least one meeting discussion has not changed, determining, by one or more computer devices, at least one additional video that corresponds to the meeting tone;
  determining, by one or more computer devices, a rotation for the second video and the at least one additional video; and
  substituting, by one or more computer devices, the second video and the at least one additional video into the video conference in place of the video feed in the video conference according to the determined rotation.

* * * * *